(12) United States Patent
Tiwari et al.

(10) Patent No.: US 11,294,867 B2
(45) Date of Patent: Apr. 5, 2022

(54) INTERNET OF THINGS ARCHITECTURE WITH A CLOUD-BASED INTEGRATION PLATFORM

(71) Applicant: Carrier Corporation, Palm Beach Gardens, FL (US)

(72) Inventors: Ankit Tiwari, South Windsor, CT (US); Hector Moner Poy, Cork (IE); Michael Ramoutar, Westford, MA (US); Daniele Campana, Cork (IE); Pedro Fernandez Orellana, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 71 days.

(21) Appl. No.: 16/493,683

(22) PCT Filed: Mar. 15, 2018

(86) PCT No.: PCT/US2018/022550
§ 371 (c)(1),
(2) Date: Sep. 12, 2019

(87) PCT Pub. No.: WO2018/170206
PCT Pub. Date: Sep. 20, 2018

(65) Prior Publication Data
US 2020/0133925 A1 Apr. 30, 2020

Related U.S. Application Data

(60) Provisional application No. 62/471,652, filed on Mar. 15, 2017.

(51) Int. Cl.
G06F 16/182 (2019.01)
H04L 67/1097 (2022.01)
(Continued)

(52) U.S. Cl.
CPC ...... *G06F 16/1827* (2019.01); *H04L 12/4633* (2013.01); *H04L 67/1097* (2013.01);
(Continued)

(58) Field of Classification Search
None
See application file for complete search history.

(56) References Cited

U.S. PATENT DOCUMENTS 9,372,922 B2 6/2016 Shaashua et al.
9,396,015 B2 7/2016 Sundaresan et al.
(Continued)

FOREIGN PATENT DOCUMENTS

CN 102025577 A 4/2011
CN 202026478 U 11/2011
(Continued)

OTHER PUBLICATIONS

ISR for Application No. PCT/US2018/022550 dated Jul. 24, 2018; 8 pages.
(Continued)

*Primary Examiner* — Jeffrey R Swearingen
(74) *Attorney, Agent, or Firm* — Cantor Colburn LLP

(57) ABSTRACT

An Internet of Things architecture includes a gateway, a first dongle, a first wireless device, and a cloud platform. The gateway includes a first serial port. The first dongle is received by the first serial port, and is configured to communicate using a first communication technology. The first wireless device is configured to communicate a first coded message to the first dongle using the first communication technology. The cloud platform includes a network abstraction layer that includes a first communication technology module configured to receive the first coded message associated with the first communication technology and output a first decoded message.

14 Claims, 3 Drawing Sheets

(51) Int. Cl.
  *H04L 67/12* (2022.01)
  *H04L 67/5681* (2022.01)
  *H04L 67/63* (2022.01)
  *H04L 12/46* (2006.01)

(52) U.S. Cl.
  CPC .......... *H04L 67/12* (2013.01); *H04L 67/2847* (2013.01); *H04L 67/327* (2013.01)

(56) References Cited

U.S. PATENT DOCUMENTS

| | | | |
|---|---|---|---|
| 9,507,799 B1* | 11/2016 | Goodson | G06F 16/13 |
| 2012/0182939 A1* | 7/2012 | Rajan | G16H 40/67 |
| | | | 370/328 |
| 2015/0156266 A1* | 6/2015 | Gupta | H04L 67/12 |
| | | | 709/224 |
| 2015/0288541 A1 | 10/2015 | Fargano et al. | |
| 2016/0135241 A1* | 5/2016 | Gujral | H04L 67/12 |
| | | | 370/328 |
| 2016/0239767 A1 | 8/2016 | Wewalaarachchi et al. | |
| 2016/0247238 A1 | 8/2016 | Kunapuli et al. | |
| 2016/0285708 A1 | 9/2016 | Papadopoulos et al. | |
| 2016/0366571 A1 | 12/2016 | Payne et al. | |
| 2016/0377491 A1* | 12/2016 | Ban | G01K 13/20 |
| | | | 374/1 |
| 2017/0063674 A1 | 3/2017 | Maskalik et al. | |
| 2017/0064073 A1* | 3/2017 | Spencer | H04M 1/72463 |
| 2017/0064491 A1* | 3/2017 | Mirza | H04L 43/106 |
| 2017/0230461 A1* | 8/2017 | Verma | H04L 12/2803 |
| 2018/0048987 A1* | 2/2018 | Morris | H04W 4/50 |
| 2018/0375944 A1* | 12/2018 | Dong | H04L 67/125 |

FOREIGN PATENT DOCUMENTS

| | | |
|---|---|---|
| CN | 102448202 A | 5/2012 |
| CN | 102510362 A | 6/2012 |
| CN | 102724143 A | 10/2012 |
| CN | 203984447 U | 12/2014 |
| CN | 104378286 A | 2/2015 |
| CN | 104635676 A | 5/2015 |
| CN | 104683173 A | 6/2015 |
| CN | 105160845 A | 12/2015 |
| WO | 2015117401 A1 | 8/2015 |
| WO | 2016022017 A1 | 2/2016 |

OTHER PUBLICATIONS

Written Opinion for Application No. PCT/US2018/022550 dated Jul. 24, 2018; 17 pages.

Gubbi, J. et al. "Internet of Things (IoT): AVision, Architectural Elements, and Future Directions", Future Generation Computer Systems, vol. 29, Issue 7, Sep. 2013, pp. 1645-1660.

European Search Report Issued in European Application No. 18717453.7-1212 dated Sep. 23, 2021; 19 Pages.

* cited by examiner

INTERNET OF THINGS ARCHITECTURE WITH A CLOUD-BASED INTEGRATION PLATFORM

CROSS-REFERENCE TO RELATED APPLICATIONS

This is a National Stage Application of PCT/US2018/022550 filed Mar. 15, 2018 which claims priority to U.S. Provisional Application No. 62/471,652 filed Mar. 15, 2017, both of which are incorporated herein by reference in their entirety.

BACKGROUND

The present disclosure relates to an Internet of Things (IoT) architecture, and more particularly, to an IoT architecture with a cloud-based integration platform.

Known integration of different communication technologies and standards to enable interoperability with IoT ecosystem may require making changes down to the sensor hardware/firmware levels. For example, a variety of sensors, or wireless devices, as part of a single network or communication system may each operate under different network protocols that if not contended with, will restrain integration of the devices as part of a singular system. Making integration changes at the sensor hardware/firmware level may hinder the integration of devices already deployed. Moreover, anticipating communication technologies that may be widely adopted is also a challenge. Further development of wireless device integration techniques and processes is desirable.

SUMMARY

An Internet of Things architecture according to one, non-limiting, embodiment of the present disclosure includes a gateway including a first serial port; a first dongle received by the first serial port and configured to communicate with a first communication technology; a first wireless device configured to communicate a first coded message to the first dongle using the first communication technology; and a cloud platform including a network abstraction layer that includes a first communication technology module configured to receive the first coded message associated with the first communication technology and output a first decoded message.

Additionally to the foregoing embodiment, the Internet of Things architecture includes a second dongle received by a second serial port of the gateway, and configured to communicate with a second communication technology different from the first communication technology; and a second wireless device configured to communicate a second coded message to the second dongle using the second communication technology, wherein a communication technology identifier agent of the network abstraction layer is configured to differentiate between the first and second communication technologies and send the first coded message to the first communication technology module, and send the second coded message to a second communication technology module of the network abstraction layer for the output of a second decoded message.

In the alternative of additionally thereto, in the foregoing embodiment, the cloud platform includes a data integration layer configured to receive the first and second decoded messages for data integration.

In the alternative of additionally thereto, in the foregoing embodiment, the gateway includes an IP tunneling module configured to tunnel coded messages to and from the cloud platform.

In the alternative of additionally thereto, in the foregoing embodiment, the gateway includes an IP tunneling module configured to tunnel coded messages to and from the cloud platform.

In the alternative of additionally thereto, in the foregoing embodiment, the Internet of Things architecture includes a router operatively disposed between the gateway and the cloud platform for transferring the first and second coded messages.

In the alternative of additionally thereto, in the foregoing embodiment, the gateway is a router.

In the alternative of additionally thereto, in the foregoing embodiment, the router supports Network Attached Storage (NAS) protocol for deriving power and coded message access.

In the alternative of additionally thereto, in the foregoing embodiment, the gateway includes an agent module and a database module, the agent module being configured to look up in the database module a coded message transmission associated to an automated action when the gateway loses cloud connectivity, or look up a response in the database module associated with an incoming message received from the first wireless device when the gateway loses cloud connectivity.

In the alternative of additionally thereto, in the foregoing embodiment, the agent module is configured to send the coded message, associated to an automated action, or response out on the first serial port.

In the alternative of additionally thereto, in the foregoing embodiment, the response is one of a plurality of responses and the incoming message is one of a plurality of messages with each message corresponding to a respective response of the plurality of responses.

In the alternative of additionally thereto, in the foregoing embodiment, the plurality of responses and the plurality of messages and automated actions in a coded message format are downloaded from the cloud platform during an initialization process.

In the alternative of additionally thereto, in the foregoing embodiment, the cloud platform includes an analytics layer configured to receive an output from the data integration layer, and an application layer configured to receive an output from the analytics layer.

A method of operating an Internet of Things architecture according to another, non-limiting, embodiment includes sending a plurality of coded messages from respective wireless devices of a plurality of wireless devices to a gateway, wherein each wireless device operates under a different communication technology; tunneling the plurality of coded messages by the gateway; receiving the plurality of coded messages by a network abstraction layer of a cloud platform; identifying the communication technology of each one of the plurality of coded messages by the network abstraction layer; and decoding the plurality of coded messages by the network abstraction layer.

Additionally to the foregoing embodiment, the method includes loading a plurality of messages and a plurality of corresponding responses into a database module of the gateway; and matching each one of the plurality of coded messages to a respective one of the plurality of messages to obtain a respective response of the plurality of responses by the agent module when cloud connectivity is lost.

In the alternative or additionally thereto, in the foregoing embodiment, the method includes enabling automated actions when cloud connectivity is lost, wherein the automated actions are stored in the DB modules as coded messages; and sending the automated actions by the agent module to the wireless devices via a serial driver.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
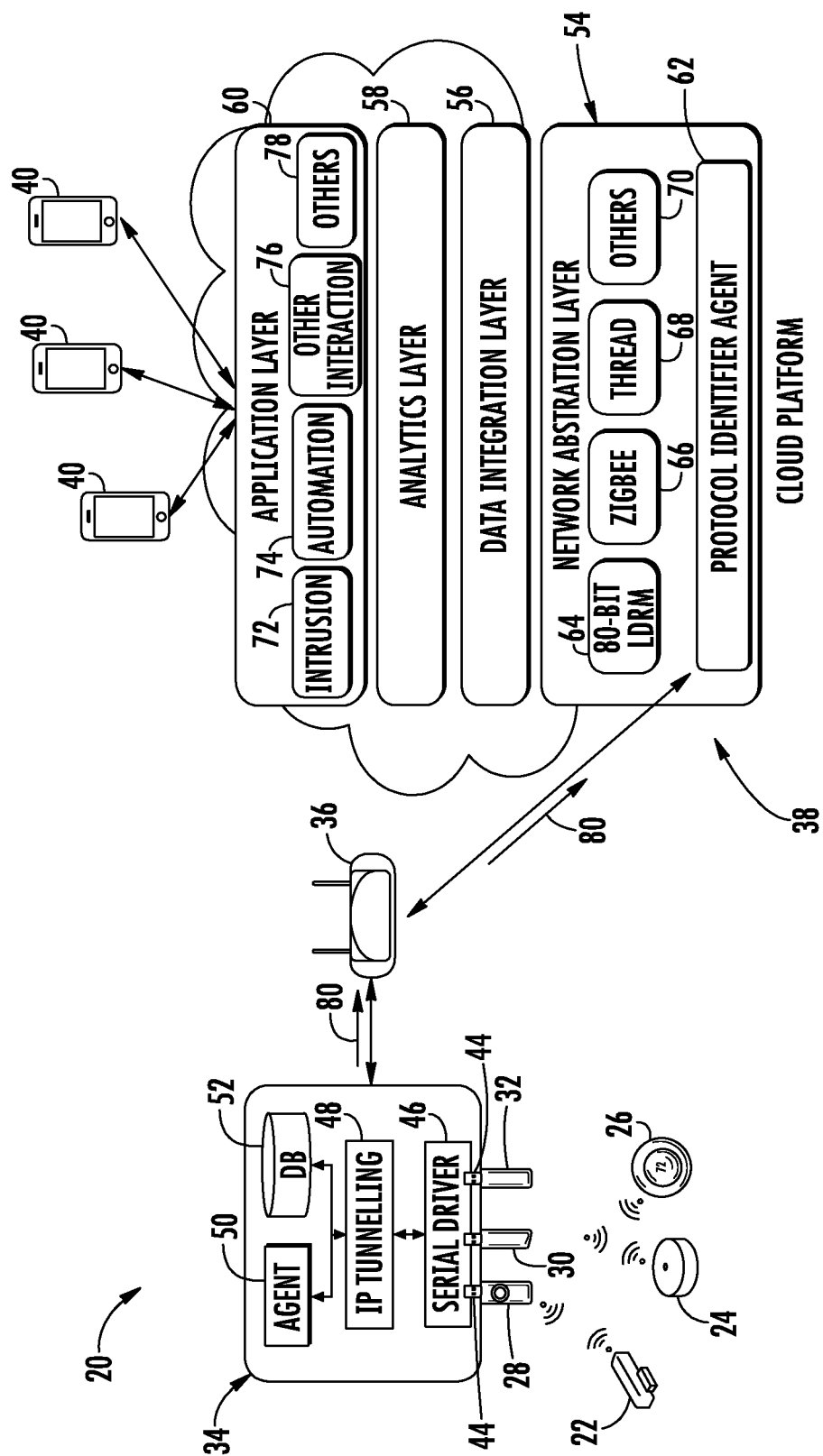
FIG. 1 is a schematic of an Internet of Things (IoT) architecture as one, non-limiting, exemplary embodiment of the present disclosure.

Referring to FIG. 1, an exemplary embodiment of an IoT architecture, or wireless communication system, 20 is illustrated. The IoT architecture 20 may include a plurality of wireless devices (i.e., three illustrated as 22, 24, 26), a plurality of dongles (i.e., three illustrated as 28, 30, 32), a gateway 34, a router 36, a cloud platform 38, and a user application 40 that may be a mobile application. The plurality of wireless devices 22, 24, 26 may each operate under a different communication technology (e.g., network protocol). For example, wireless device 22 may operate with a 433 MHz protocol, and may, for example, be a door sensor. Wireless device 24 may operate with an IEEE 802.15.4, or ZigBee, protocol, and may, for example, be a humidity sensor, a temperature sensor, and/or a thermostat. And, wireless device 26 may operate under any variety of other network protocols.

Figure 2:
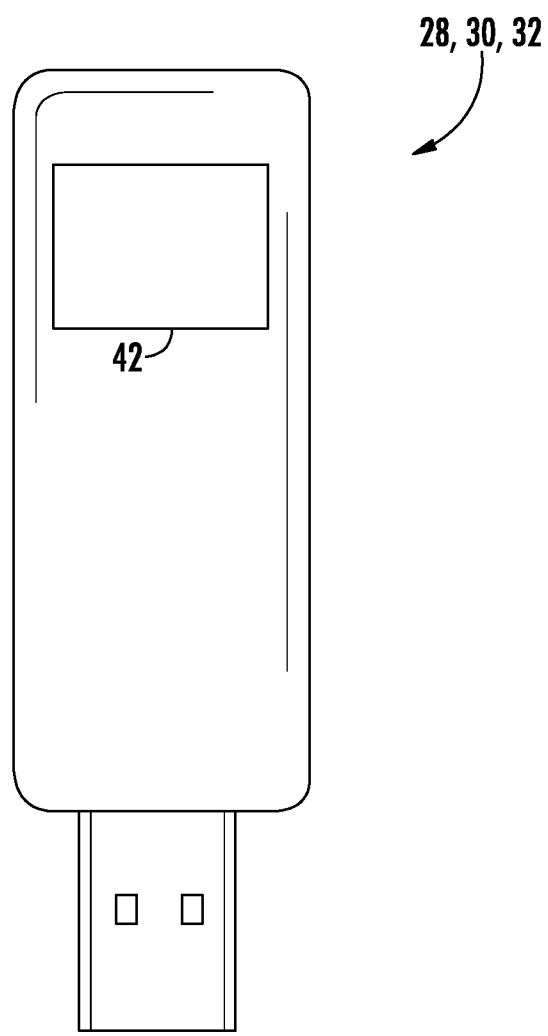
FIG. 2 is a schematic of a dongle of the IoT architecture.

Like the wireless devices 22, 24, 26, the dongles 28, 30, 32 may be configured to operate under different network protocols. In one embodiment, the each dongle 28, 30, 32 is associated and communicates with a respective wireless device 22, 24, 26 under the appropriate protocol. For example, dongle 28 may operate with a 433 MHz protocol, dongle 30 may operate with an IEEE 802.15.4, or ZigBee, protocol, and dongle 32 may operate under yet another protocol that matches the protocol of the wireless device 26. Referring to FIGS. 1 and 2, each dongle 28, 30, 32 may generally be, or includes, a transceiver 42 for wireless communicating with the respective wireless device 22, 24, 26.

The gateway 34 may be a lean gateway, and may include a plurality of serial ports 44 (e.g., Universal Serial Bus (USB) ports) configured to receive the dongles 28, 30, 32, a serial driver 46, an Internet Protocol (IP) tunneling module 48, an agent module 50, and a database (DB) module 52. In one example, the gateway 34 may be configured to communicate with the router 36 in a wireless or a wired manner (e.g., Wi-Fi or Ethernet). In another example, the gateway 34 may generally be part of the router 36, and/or the gateway hardware directly communicates with the router 36. In another embodiment, the gateway hardware may connect directly to router USB ports supporting Network Attached Storage (NAS) protocol to derive power and/or provide data access. The IP tunneling module 48 establishes communication with a server at a high level. The serial driver 46, the IP tunneling module 48, the agent module 50 and the DB module 52 may be part of, or supported by, a computing processor (e.g., microprocessor) and a computer writeable and readable storage medium of the gateway 34.

The cloud platform 38 may include a network abstraction layer 54, a data integration layer 56, an analytics layer 58, and an application layer 60. The network abstraction layer 54 may include a communication technology identifier agent 62, and a plurality of communication technology modules (i.e., four illustrated as 64, 66, 68, 70). The application layer 60 may be configured to communicate with the user application(s) 40, and may include an intrusion module 72, an automation module 74, a user interaction module 76, and/or other modules 78.

During normal operation, the devices 22, 24, 26 may send coded messages (i.e., messages encapsulated within frame formats and composed as specified in a particular protocol), wirelessly to the respective dongles 28, 30, 32 that forward the coded messages to the IP tunneling module 48 via the serial driver 46. The IP tunneling module 48 may attach relevant information to these messages (i.e., such as a communication technology identifier, gateway identifier, and others) and send the final gateway-encapsulated coded message (see arrow 80) to the communication technology identifier agent 62 of the network abstraction layer 54 via the router 36. The communication technology identifier agent 62 is configured to identify the protocol of a coded message inside the gateway-encapsulated coded message 80, and then transfers the coded message 80 to the appropriate communication technology module 64, 66, 68, 70. The module 64, 66, 68, 70 may then decode the coded message into a decoded, or generic, message. The protocol identification may be accomplished via an identifier from the gateway-encapsulated coded message 80, or by implementation of a logic able to identify frame formats from coded messages.

The decoded message is transferred from the corresponding module 64, 66, 68, 70 to the data integration layer 56 that processes the received heterogeneous data within generic format messages, and combines data sets to store and present them in a unified view. For instance, the data integration layer may receive information from a temperature sensor (i.e., a generic message) from different devices. The integration layer 56 processes the temperature sensor messages and extracts the owner of the associated temperature sensors, the temperature sensor locations, and the values. All of this information may be combined in a unified data structure (e.g., a table in a database, a virtual object, and others) to allow an easy access and usage of the data by upper applications and services.

The analytics layer 58 receives is composed of services and processes that make use of the received and unified data from the data integration layer 56. The services and processes facilitate the examination of data sets in order to extract meaning from raw data and draw conclusions about the information the raw data contains. This may be achieved by specialized systems and software that transforms, organizes, and models the data to identify patterns. This may be referred to as "big data applications."

After analyzing the integrated data, the analytics layer 58 may provide smarter and more complex services and functionalities to the application layer(s) 60. The applications 72, 74, 76, 78 (i.e., upper applications) may make use of the services from the analytics layer 58 and the raw data from the data integration layer 56 in order to provide specialized functionalities to the user(s), which may interface with the upper application through user applications 40.

Figure 3:
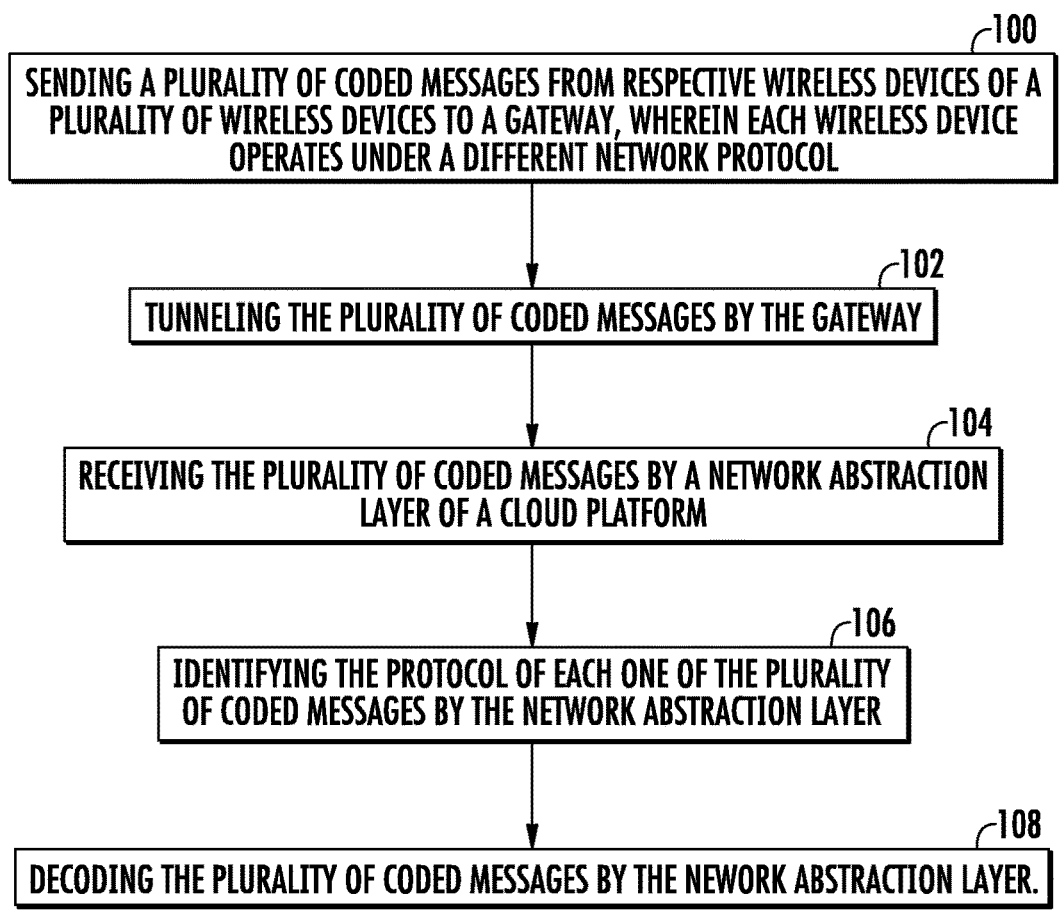
FIG. 3, is a flowchart illustrating a method of operating the IoT architecture when cloud connectivity is established.

Referring to FIG. 3 and during normal operation while cloud connectivity is maintained, at block 100, a plurality of coded messages 80 may be sent from respective wireless devices 22, 24, 26 to the gateway 34. At block 102, the gateway 34 may tunnel the plurality of coded messages. At block 104, the plurality of coded messages may be received by a network abstraction layer 54 of the cloud platform 38. At block 106, the communication technology identifier agent 62 of the network abstraction layer 38 identifies the protocol of each one of the plurality of coded messages. At block 108, various communication technology modules 64, 66, 68, 70 of the network abstraction layer 38 decode associated coded messages of the plurality of coded messages.

Figure 4:
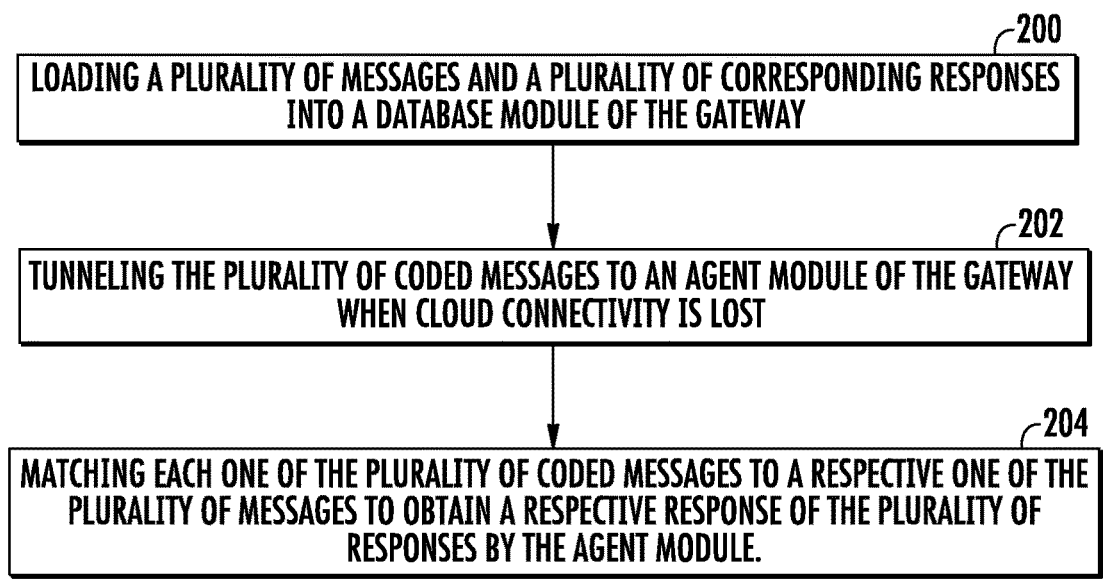
FIG. 4 is a flowchart illustrating a method of operating the IoT architecture when cloud connectivity is lost.

Referring to FIG. 4 and during operation while cloud connectivity is lost; at block 200 and as part of initializing the network, the DB module 52 of the gateway 34 may be pre-loaded with a plurality of coded messages and responses that correspond to a plurality of automated actions to be taken if connectivity with the cloud is lost. At block 202, the IP tunneling module 48 may tunnel/transfer a plurality of coded messages 80 (i.e., that may include responses) to the DB module 52 of the gateway 34. At block 204, the agent module 50 may match each one of the plurality of received coded messages 80 from the wireless devices 22, 24, 26 to a respective one of the plurality of coded messages and responses pre-loaded in the DB module 52.

Advantages and benefits of the present disclosure include the abstracting the network controller at a cloud level that allows upgrading or integration of new communication protocols into the platform without releasing a new version of the gateway firmware, thus saving on non-recurring engineering costs. Moreover, the present disclosure facilitates the use of a generic gateway that may serve any combination of protocols and application, limited only by the cloud software functionality. Yet further, because the gateway includes agent and DB modules, basic functionality is generally maintained even upon loss of cloud connectivity. The present disclosure results in the integration of new technology that is transparent to the user (i.e., may just require the connection of a USB dongle), and may be less expensive because the protocol abstraction logic is deployed in the cloud and not in every deployed sensor.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An Internet of Things architecture comprising:
a gateway including a first serial port;
a first dongle received by the first serial port and configured to communicate with a first communication technology;
a first wireless device configured to communicate a first coded message to the first dongle using the first communication technology; and
a cloud platform including a network abstraction layer that includes a first communication technology module configured to receive the first coded message associated with the first communication technology and output a first decoded message, wherein the gateway includes an agent module and a database module, the agent module being configured to look up in the database module a coded message transmission associated to an automated action when the gateway loses cloud connectivity, or look up a response in the database module associated with an incoming message received from the first wireless device when the gateway loses cloud connectivity.

2. The Internet of Things architecture set forth in claim 1, further comprising:
a second dongle received by a second serial port of the gateway, and configured to communicate with a second communication technology different from the first communication technology; and
a second wireless device configured to communicate a second coded message to the second dongle using the second communication technology, wherein a communication technology identifier agent of the network abstraction layer is configured to differentiate between the first and second communication technologies and send the first coded message to the first communication technology module, and send the second coded message to a second communication technology module of the network abstraction layer for the output of a second decoded message.

3. The Internet of Things architecture set forth in claim 2, wherein the cloud platform includes a data integration layer configured to receive the first and second decoded messages for data integration.

4. The Internet of Things architecture set forth in claim 3, wherein the gateway includes an IP tunneling module configured to tunnel coded messages to and from the cloud platform.

5. The Internet of Things architecture set forth in claim 1, wherein the gateway includes an IP tunneling module configured to tunnel coded messages to and from the cloud platform.

6. The Internet of Things architecture set forth in claim 3, further comprising:
a router operatively disposed between the gateway and the cloud platform for transferring the first and second coded messages.

7. The Internet of Things architecture set forth in claim 3, wherein the gateway is a router.

8. The Internet of Things architecture set forth in claim 7, wherein the router supports Network Attached Storage (NAS) protocol for deriving power and coded message access.

9. The Internet of Things architecture set forth in claim 1, wherein the agent module is configured to send the coded message, associated to an automated action, or response out on the first serial port.

10. The Internet of Things architecture set forth in claim 1, wherein the response is one of a plurality of responses and the incoming message is one of a plurality of messages with each message corresponding to a respective response of the plurality of responses.

11. The Internet of Things architecture set forth in claim 10, wherein the plurality of responses and the plurality of messages and automated actions in a coded message format are downloaded from the cloud platform during an initialization process.

12. The Internet of Things architecture set forth in claim 3, wherein the cloud platform includes an analytics layer configured to receive an output from the data integration layer, and an application layer configured to receive an output from the analytics layer.

13. A method of operating an Internet of Things architecture comprising:
sending a plurality of coded messages from respective wireless devices of a plurality of wireless devices to a gateway, wherein each wireless device operates under a different communication technology;
tunneling the plurality of coded messages by the gateway;
receiving the plurality of coded messages by a network abstraction layer of a cloud platform;
identifying the communication technology of each one of the plurality of coded messages by the network abstraction layer;
decoding the plurality of coded messages by the network abstraction layer;
loading a plurality of messages and a plurality of corresponding responses into a database module of the gateway; and
matching each one of the plurality of coded messages to a respective one of the plurality of messages to obtain a respective response of the plurality of responses by the agent module when cloud connectivity is lost.

14. The method set forth in claim 13, further comprising:
enabling automated actions when cloud connectivity is lost, wherein the automated actions are stored in the DB modules as coded messages; and
sending the automated actions by the agent module to the wireless devices via a serial driver.

* * * * *